April 20, 1943.    H. N. DIMICK    2,316,938
SHOE CONTROL MECHANISM FOR STRADDLE TRUCKS
Filed April 14, 1941    3 Sheets-Sheet 1

INVENTOR.
HENRY N. DIMICK
BY
ATTORNEY.

April 20, 1943. H. N. DIMICK 2,316,938
SHOE CONTROL MECHANISM FOR STRADDLE TRUCKS
Filed April 14, 1941 3 Sheets-Sheet 2

INVENTOR.
HENRY N. DIMICK
BY Harold L. Cook
ATTORNEY.

April 20, 1943.    H. N. DIMICK    2,316,938
SHOE CONTROL MECHANISM FOR STRADDLE TRUCKS
Filed April 14, 1941    3 Sheets-Sheet 3
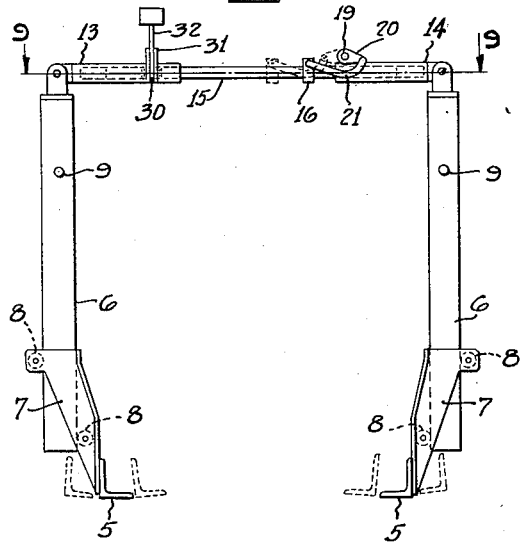
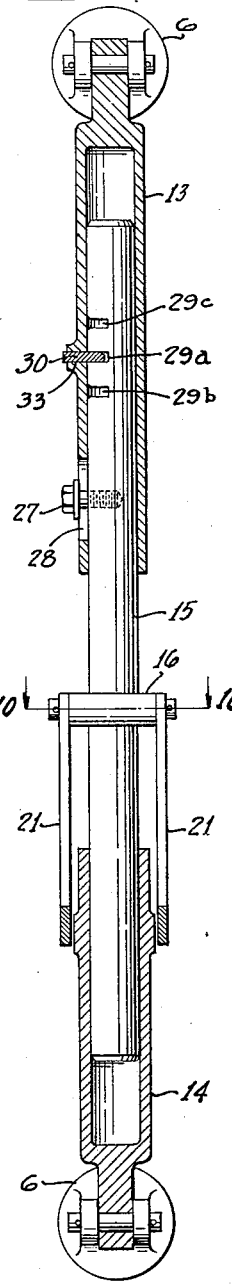
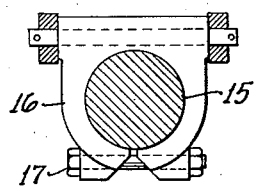
INVENTOR.
HENRY N. DIMICK
BY 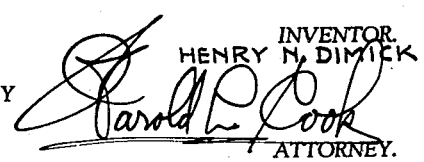
ATTORNEY.

Patented Apr. 20, 1943

2,316,938

UNITED STATES PATENT OFFICE 2,316,938

SHOE CONTROL MECHANISM FOR STRADDLE TRUCKS

Henry N. Dimick, Portland, Oreg., assignor to Willamette Hyster Company, Portland, Oreg., a corporation of Oregon Application April 14, 1941, Serial No. 388,420

11 Claims. (Cl. 212—141)

This invention relates to that class of automotive vehicles known as straddle trucks, used primarily for the transportation of loads such as stacks of lumber, boxed or crated shipments, etc., and has particular reference to an improved mechanism for actuating the load grappling equipment.

Straddle trucks are designed to overrun a load to be carried thereby and to pick it up and carry it beneath the frame of the truck and between the wheels in a "straddled" position. Each straddle truck is designed to handle a load of predetermined maximum height, this being known as the load space height, and to handle a load of predetermined maximum width, this being known as load space width. Loads of lesser height than the load space height of the truck can, of course, be lifted and transported; but loads of narrower width than a permitted range of widths cannot be handled by a straddle truck built to accommodate loads of a width within said range.

Each truck is provided with grappling means, called "shoes," for engaging and lifting the load. These shoes are mounted upon vertically disposed frames, one at each side of the truck between the front and rear wheels. The shoe supporting frame is provided with trunnions journaled in the truck frame and on which the shoe supporting frame is permitted to swing to move the shoe toward or away from the load. The upper ends of the shoe supporting frames are interconnected by an extensible bar, the length of which is determined by a control mechanism which is operable to move the shoes into position to engage or disengage the load accordingly as it is desired to load or unload the truck.

Heretofore, the extension of the bar interconnecting the shoe supporting frames has been from a point to a point, both of which were fixed and predetermined; and as a result, each straddle truck has been capable of lifting and transporting loads the widths of which were within certain well defined limits. In contradistinction thereto, the present invention provides an improved mechanism for extending the actuating bar from an adjustable point to a point fixed only in relation to the first point, the shoes being movable thereby into position to engage and lift loads of a width within a range beginning several times narrower than could heretofore be handled by the truck.

It is, therefore, an object of the invention to provide an improved mechanism for actuating the load grappling equipment on a straddle truck whereby the range of widths of loads handled by the truck will be greatly increased.

A further object of the invention is to provide means on a straddle truck for adjusting the length of the bar which operates the load carrying shoes prior to extending or telescoping the bar to move the shoes.

A further object of the invention is to provide means on a straddle truck for adjusting the points of maximum distances between the load engaging shoes, from which points the shoes may be moved inwardly to engage the load.

A further object of the invention is to provide in a straddle truck means for adjusting the fixed positions from which the shoes move to engage and disengage a load.

A further object of the invention is to provide means on a straddle truck for increasing the usefulness of the truck.

With these and other objects and advantages in mind, the invention resides in the novel construction and combination of parts hereinafter described, illustrated in the accompanying drawings, and set forth in the appended claims; it being understood that various changes in form, proportion, size and details of construction within the scope of the claims may be resorted to without departing from the spirit or sacrificing any of the advantages of the invention.

Figure 1:
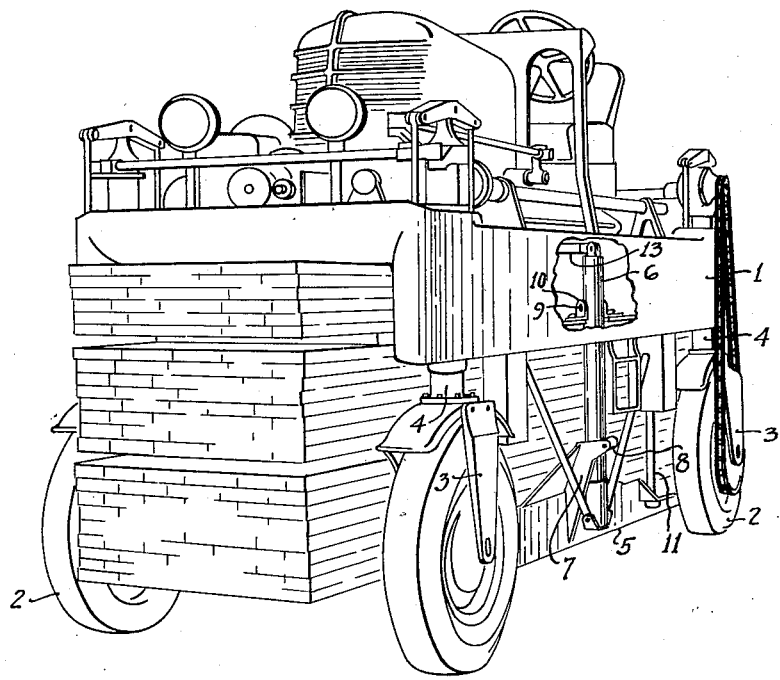
Figure 1 is a generally perspective view of a straddle truck embodying my invention, a portion of the frame being broken away to reveal a part of the mechanism to which the invention relates.

Figure 8 is a somewhat diagrammatic elevation showing the three positions to which the load engaging shoes are moved in response to the several adjustments of the length of the actuating bar. The full lines illustrate the maximum distance between the shoes with the actuating bar locked in intermediate position. The dotted lines illustrate the maximum distances, respectively, between the shoes when the actuating bar is locked in the extreme end positions of its movement.

Figure 9 is a section in plan, taken on the line 9—9 in Figure 8.

Figure 10 is a vertical section taken on line 10—10 in Figure 9 showing the clamp for anchoring the toggle links to the swing rod.

Referring to the drawings, the truck comprises a frame 1, mounted upon wheels 2 carried in wheel forks 3. The stems 4 of the wheel forks extend vertically above the wheels and support the truck frame 1 at a height to permit the truck to overrun a load to be carried thereby and pick it up and carry it in a straddled position. All of the operating mechanism, including the motor (not shown), the driving and hoisting mechanisms, and operating levers, linkage, etc., is mounted above the frame to provide a load space beneath the frame and between the wheels. As best shown in Figure 8, the load grappling equipment comprises load engaging shoes 5 adapted to be moved vertically on swing posts 6 by a hoisting mechanism comprising lift rods 11. To facilitate vertical movement of the shoes 5, the upright legs 7 are provided with guide rollers 8 which engage opposite sides of the swing posts. Each swing post is provided with trunnions 9 journaled in bearings 10 mounted in the side walls of the frame 1. The trunnions 9 are disposed longitudinally of the truck frame, and so permit the swing posts to swing transversely of the frame and impart a lateral movement to the shoes 5 toward or away from the load. The swing posts 6 are mounted in the side walls of the frame 1 midway between the front and rear wheels and approximately in alignment therewith.

The upper ends of the swing posts are interconnected by an extensible bar upon which is mounted the mechanism for adjusting the points of maximum distances between the load engaging shoes, as well as mechanism for moving the shoes from these fixed points inwardly to engage the load.

Figure 5:
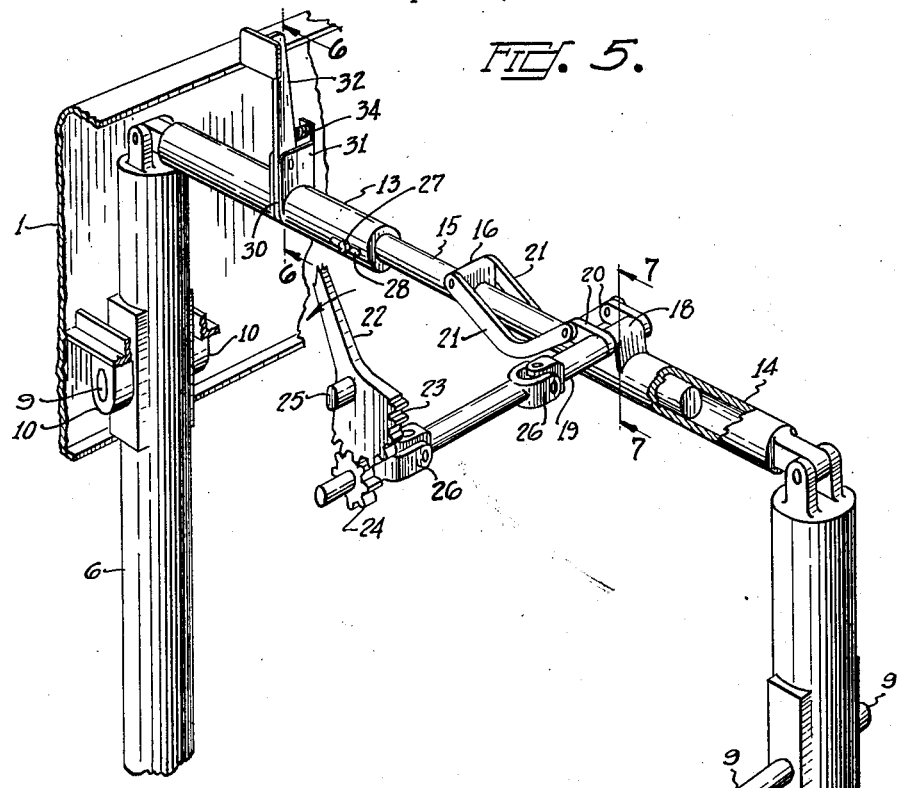
Figure 5 is a perspective view of the shoe actuating mechanism having the invention incorporated therein.
Figure 6:
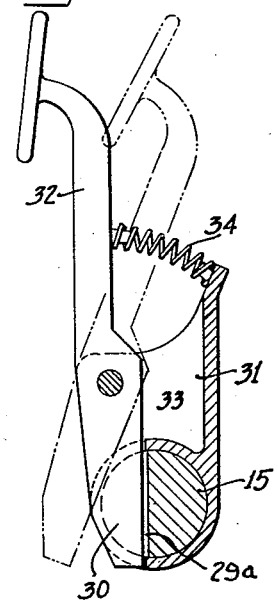
Figure 6 is a vertical section taken on the line 6—6 in Figure 5, showing the mechanism for permitting adjustment of the fixed length of the actuating bar.
Figure 7:
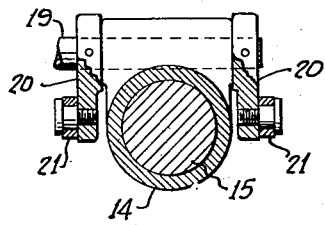
Figure 7 is a vertical section taken on the line 7—7 in Figure 5, but showing the crank arms in mid position.

To the upper ends of the swing posts 6 are pivotally attached the ends of tubes 13 and 14, these tubes being of insufficient length to meet in end to end abutting relation when placed in alignment transversely of the truck. Slidably engaging each of the tubes 13 and 14 and extending therebetween is a swing rod 15. Mounted on the rod 15 intermediate the ends of the tubes 13 and 14 is a block 16, a clamping bolt 17 being provided for permitting necessary adjustments of the position of the block on the rod 15. Mounted on the end of the tube 14 is a bearing member 18 in which is journaled a crank shaft 19 having crank arms 20. Toggle links 21 interconnect the block 16 and the ends of the crank arms 20. Rotation of the crank shaft 19 causes the ends of the crank arms 20 to describe an arc of 180°, thus varying the overall length of the tube 14 and extended portion of the swing rod 15 by an amount equal to twice the length of the crank arms 20. By way of illustration, assuming that the crank arms 20 are in the position illustrated in Figure 5 and the crank shaft 19 is rotated to cause the crank arms to move into the position illustrated in full lines in Figure 8, the overall length of the tube 14 and extended portion of the swing rod 15 would be shortened by an amount equal to twice the length of the crank arms 20. This operation results in correspondingly shortening the distance between the upper ends of the swing posts 6 and serves to move the load engaging shoes to their outermost or load disengaging position. Rotation of the crank shaft 19 to cause the crank arms to move from the position shown in full lines in Figure 8 through an arc of 180° to the position shown in Figure 5 increases the overall length of the tube 14 and the extended portion of the swing rod 15 by an amount equal to twice the length of the crank arms 20. This operation serves to increase the distance between the upper ends of the swing posts 6 and to move the load engaging shoes 5 to their innermost or load engaging position. Rotation of the crank shaft 19 is accomplished by a hand lever 22 having a quadrant 23 adapted to mesh with the gear wheel 24 keyed to the crank shaft 19. The lever 22 is fulcrumed at 25, force being applied to the handle, not shown, in the direction indicated by the arrow (Figure 5) to rotate the gear wheel 24 in the proper direction to swing the crank arms into the position shown and so increase the distance between the ends of the tubes 13 and 14. Universal joints 26—26 in the crank shaft 19 provide sufficient flexibility for ordinary operating conditions.

The end of the rod 15, received within the tube 13, is secured therewithin by means of a tap bolt 27; a slot 28 in the tube 13 permitting a limited sliding movement of the rod 15 in the tube. The rod 15 is provided with notches 29a, 29b and 29c, these notches being designed to receive a key 30 mounted on the tube 13 for holding the rod immovable relative to the tube. When the key 30 is in engagement with one of the notches 29 (a, b or c), the rod 15 and tube 13 comprise a unit of fixed length which cannot be varied except by disengaging the key 30 from the notch, whereupon the rod may be moved longitudinally of the tube until the key engages one of the other notches. If it is desired to reduce the combined length of the rod 15 and tube 13, the key 30 is withdrawn from the notch 29a and is caused to engage notch 29b, it being necessary to receive a greater proportion of the rod 15 within the tube 13 to permit the key 30 to enter the desired notch. If instead it is desired to increase the length of the rod 15 and tube 13, the key is withdrawn from engagement with the notch 29a and the rod withdrawn from the tube until the notch 29c is in position to receive the key, whereupon the key enters the notch 29c, holding the rod rigidly in the extended position. The slot 28 is of sufficient length to permit the rod 15 to move longitudinally of the tube 13 sufficiently to position any one of the notches 29 (a, b or c) in place to receive the key 30.

The tube 13 is provided with a webbed flange 31 and pivoted therein is a lever or pedal 32, one arm of which forms the key 30. Normally the key 30 is seated in a slot 33 in the tube 13, through which the key 30 engages one of the notches 29 (a, b or c) in the rod 15. A compression spring 34 bears at one end against the flange 31 and at the other end against the arm of the pedal 32, the function of the spring being to hold the key 30 in the slot 33 and in engagement with the selected one of the notches in the rod 15.

Figure 2:
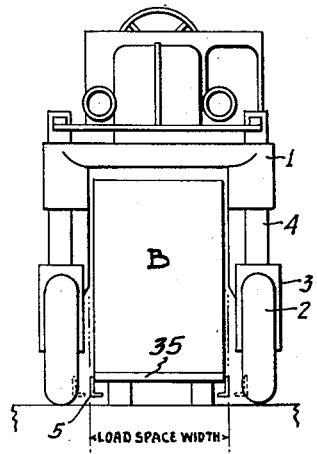
Figures 2, 3 and 4 are front elevations of a straddle truck, illustrating the relation of various width loads thereto.
Figure 3:
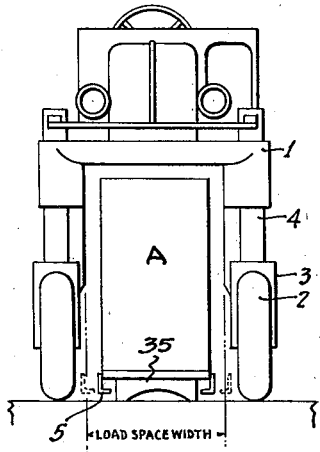
Figure 4:
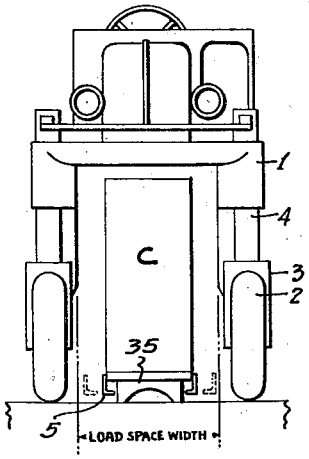

Figures 2, 3 and 4 illustrate loads of various widths in position to be engaged by the shoes 5 and thereupon be lifted and transported to any place of unloading. For convenience of operation, a load is accumulated upon a bolster 35. The bolster 35 may become and remain a part of the load, and this is especially true when the load comprises a number of separate pieces, such as the load of lumber illustrated as being carried upon the truck in Figure 1. Where loads of this character are handled it is necessary that the bolster underrun the load and support it through its entire width during the lifting and transporting operation. Where the load comprises a crate or box, of sufficient width to be grappled by the shoes 5, the bolster 35 may be used only as a means of support for the load to enable the shoes to be moved into engagement therewith prior to the lifting operation.

Figures 2, 3 and 4 are illustrative of the range of load widths within which the improved truck is adapted for service. In connection with the further description of the operation of the mechanism, it is suggested that particular attention be given to Figures 2, 3, 4 and 8 of the drawings.

Reference has been made herein to the load space width of the truck, this being the distance between the inner surfaces of the frame members. It will be appreciated, however, that it would be extremely difficult to handle a load as wide as the load space width of the truck, and it is recommended that the actual load width be not less than three inches narrower than the load space width. This measurement provides a clearance of one and one-half inches between each side of the load and the truck frame, and promotes the rapid and efficient handling of loads to be carried by the truck. Assuming, for purposes of illustration, that the width of loads normally handled by the straddle truck is approximately six inches less than the load space width, having a clearance of three inches between each side of the load and the truck frame, reference is made to Figure 3 of the drawings, wherein is shown the approximate relation of the normal load A to the truck. Preparatory to picking up and transporting the load A the key 30 is caused to engage the middle notch 29a in the swing rod 15, and the crank arms 20 are moved to the position shown in full lines in Figure 8. With these parts in the positions indicated, the shoes 5 are in their unloaded position and the truck may be driven into loading position over the load A. Thereupon the hand lever 22 is moved to the left, as viewed in Figure 5, which serves to rotate the crank shaft 19 and move the crank arms 20 into the position shown in dotted lines in Figure 8. Rotation of the crank shaft 19 in the direction indicated serves to increase the distance between the upper end of the swing posts 6 by an amount equal to twice the length of the crank arms 20. This movement causes the shoes 5 to be moved into position to engage the load. Referring to Figure 3, the unloaded or first referred to position of the shoes is indicated in dotted lines, and the load engaging position of the shoes last referred to is shown in full lines.

Supposing that thereafter the driver of the straddle truck is called upon to transport a load of greater width than can be accommodated by the truck with the load engaging shoes 5 set in the position just described. As the truck approaches the wider load B the driver actuates the pedal 32 to disengage the key 30 from the slot 29a and at the same time moves the lever 22 to the left as viewed in Figure 5. Rotation of the crank shaft 19 tends to move the rod 15 further into the tube 13. At the moment the notch 29a passes out of registry with the slot 33, the driver may remove his foot from the pedal, whereupon the pedal, under influence of the spring 34, will seek to regain its normal position in the slot 33. As the rod 15 continues to move into the tube 13 by continued rotation of the crank shaft 19, the slot 29b comes into registry with the slot 33, whereupon the key 30 engages the slot 29b, thus stopping further movement of the rod 15 in the tube 13. Thereupon movement of the lever 22 is reversed to rotate the crank arms 20 into the position shown in full lines in Figure 8 and move the shoes 5 into the unloaded position shown in dotted lnes in Figure 2. Thereupon the truck is driven over the load B and the lever 22 is again moved to the left as viewed in Figure 5 which serves to rotate the crank arms 20 to the position shown in dotted lines in Figure 8, thereby moving the shoes 5 into the load engaging position shown in full lines in Figure 2.

In the event the driver is next called upon to pick up and transport a load of narrow width, the invention provides that the actuating bar interconnecting the upper ends of the swing posts 6 may be materially lengthened to cause the shoes 5 to be moved inwardly to a narrow operating position. In this event the pedal 32 is actuated to withdraw the key 30 from the slot 29b and lever 22 is moved to the right as viewed in Figure 5. Rotation of the crank shaft 19 tends to withdraw the swing rod 15 from the tube 13, thus increasing the overall length of the actuating bar interconnecting the upper ends of the swing posts 6. It being desired to withdraw the rod 15 from the tube 13 the maximum distance permitted by the slot 28, force is applied to the pedal 32 to hold the key 30 out of the slot 33 until notches 29b and 29a have passed out of registry with the slot 33. Thereupon the pedal may be released and the spring 34 will move the key 30 into engagement with the notch 29c at the moment the notch 29c comes into registry with the slot 33. Thereupon, the actuating bar interconnecting the upper ends of the swing posts 6 being extended to its maximum fixed length, the lever 22 is moved to the right as viewed in Figure 5 to move the shoes 5 into the unloading position shown in dotted lines in Figure 4. Thereupon, the load C being in position to be loaded, the driver moves the lever 22 to the left as viewed in Figure 5, thereby rotating the crank shaft 19 to cause the rod 15 to be withdrawn from the tube 14 the distance permitted by movement of the crank arms 20. Thus the shoes 5 are moved into the loading position shown in full lines in Figure 4, in which position, upon operation of the hoisting mechanism, they will engage and lift the load and support it during travel of the truck to the place of unloading.

There is herein illustrated and described a mechanism for actuating the load grappling equipment of a straddle truck having an actuating bar interconnecting the upper ends of swing posts 6, upon which are mounted the grappling shoes 5, the gist of the invention being found in mechanism provided for adjusting the fixed overall length of the actuating bar and for moving the grappling shoes into a fixed operating position. The drawings illustrate three possible adjustments of the overall length of the actuating bar, and in Figure 8 are shown the three operating positions of the grappling shoes corresponding to the three adjustments of the actuating bar. In describing the overall length of the actuating bar as "fixed" it is appreciated that means is provided for lessening or shortening the bar to move the shoes into and out of load engaging position. It should be understood, however, that the adjustment of the length of the bar which governs the operating position of the shoes is wholly separate and apart from the operation of the mechanism which moves the shoes toward and away from each other to engage and disengage the load. For this reason it is believed that the overall length of the actuating bar may be properly described as fixed, since the shoe controlling mechanism does not of itself determine to what widths the shoes shall be opened to permit loads to be received therebetween.

Having now described my invention and in what manner the same may be used, what I claim as new and desire to protect by Letters Patent is:

1. In a straddle truck having a frame, a pair of grappling members pivotally mounted on said frame in predetermined fixed relation in position for engaging and disengaging a load, means for moving said grappling members between load engaging and load disengaging positions while maintaining said predetermined fixed relation, and means for selectively changing said predetermined fixed relation prior to said movement to accommodate said grappling members to a load of changed dimensions.

2. In a straddle truck, a pair of grappling members mounted one on each side of said truck and movable inwardly into position to engage a load, an actuating bar interconnecting said grappling members, means for imparting movement to said bar to move said grappling members into load engaging position, and means for adjusting the length of said bar to change the positions of said members prior to commencing said movement.

3. In a straddle truck, a pair of grappling members mounted upon fixed pivots in predetermined fixed relation one on each side of said truck and pivotally movable into load engaging position, means for moving said grappling members into said position, and means for changing the relative positions of said members prior to commencing said movement.

4. In a straddle truck having a frame, a pair of swing posts mounted one on each side of said truck, said posts being journaled in said truck frame for swinging movement transversely thereof, load grappling members mounted on said swing posts, an actuating bar interconnecting the upper end of said swing posts for governing the positions of said grappling members, said actuating bar comprising a pair of disjoined aligned tubes and a rod slidably engaging each of said tubes, means for varying the overall length of one said tube and rod for moving said grappling members into load engaging and load disengaging positions, keyways in said rod, a key mounted on one of said tubes and engageable with a selected one of said keyways for determining the fixed overall length of said tube and said rod, and means for withdrawing said key and for changing the overall length of said tube and rod.

5. In a straddle truck having a frame, a pair of swing posts mounted one on each side of said frame, each said swing post pivoted intermediate its ends in said frame, load grappling members mounted on said swing posts, said swing posts being movable between a load engaging position and a load disengaging position, means interconnecting said swing posts above said pivots for moving said grappling members selectively into load engaging and load disengaging positions, and means for changing the operating position of said first named means prior to movement thereof into one of said positions for adapting the grappling members to loads of different widths.

6. In a straddle truck, having a frame, load grappling members mounted on said frame and movable between a load engaging position and a load disengaging position, means for moving said grappling members selectively into load engaging and load disengaging positions, and means for changing the operating position of said first named means prior to movement thereof into one of said positions for adapting the grappling members to loads of different dimensions.

7. In a straddle truck having a frame, load grappling members mounted on said frame, an extensible bar interconnecting said grappling members, said extensible bar comprising a tube and rod, means for moving said rod longitudinally in said tube, keyways in said rod, a key mounted on said tube and engageable with a selected one of said keyways for determining the fixed overall length of said bar.

8. In a straddle truck having a frame, load grappling members pivotally mounted on said frame, means interconnecting said grappling members above said pivotal mounting, said means comprising a pair of disjoined aligned tubes and a rod slidably engaging said tubes, means for adjusting the over all fixed length of one of said tubes and said rod for moving said grappling members to one of a number of permitted positions, and means for moving said grappling members while occupying said one position into and out of engagement with a load.

9. In a straddle truck having a frame, load grappling members pivotally mounted on said frame, means interconnecting said grappling members above said pivotal mounting, said means comprising a pair of disjoined aligned tubes and a rod slidably engaging said tubes, means for adjusting the over all fixed length of one of said tubes and said rod for moving said grappling members to one of a number of permitted positions, and telescoping means interconnecting the other of said tubes and said rod for moving said grappling members while occupying said one position into and out of engagement with a load.

10. In a straddle truck having a frame, load grappling members pivotally mounted at fixed points on said frame, means interconnecting said grappling members above said pivotal mounting and operable to move said grappling members to one of a number of permitted positions, and means for moving said grappling members while occupying said one position into and out of engagement with a load.

11. In a straddle truck having a frame, load grappling members pivotally mounted on said frame, means interconnecting said grappling members above said pivots, said means comprising a pair of disjoined aligned members and a third member slidably engaging said aligned members, means for selectively adjusting the over all length of said first named means for fixing the points of maximum distance between said grappling members, and means for moving said grappling members while occupying said fixed position into and out of engagement with a load.

HENRY N. DIMICK.